United States Patent [19]

Butera

[11] 4,206,792

[45] Jun. 10, 1980

[54] GASOLINE NOZZLE ADAPTORS

[76] Inventor: Benjamin J. Butera, MRC Box 43E, Bangor, Me. 04401

[21] Appl. No.: 928,082

[22] Filed: Jul. 26, 1978

[51] Int. Cl.[2] .......................... B65B 3/04; F16L 57/00

[52] U.S. Cl. .................................. 141/392; 138/96 T; 285/382

[58] Field of Search ...................... 141/311 R, 59, 392; 222/566; 138/96 R, 96 T, 109; 285/382, 238, 4, 259, 328, 330

[56] References Cited

U.S. PATENT DOCUMENTS

| | | | |
|---|---|---|---|
| 548,302 | 10/1895 | Dwyer | 285/382 |
| 1,927,464 | 9/1933 | McIntosh | 285/4 |
| 2,319,567 | 5/1943 | Vegell | 141/392 X |
| 3,395,740 | 8/1968 | Sutcliffe et al. | 141/392 |

*Primary Examiner*—Frederick R. Schmidt
*Attorney, Agent, or Firm*—David F. Gould

[57] ABSTRACT

A fuel nozzle adaptor for attachment to the end of a leaded gasoline dispensing nozzle to prevent the nozzle from being inserted into the filler pipe of vehicles designed to use lead free gasoline. A sleeve is provided with internal teeth to grip the tip of the nozzle. A groove or other weakened section is provided in the sleeve to cause the teeth to grip harder if strain is placed on the adaptor.

1 Claim, 3 Drawing Figures

FIG. 1
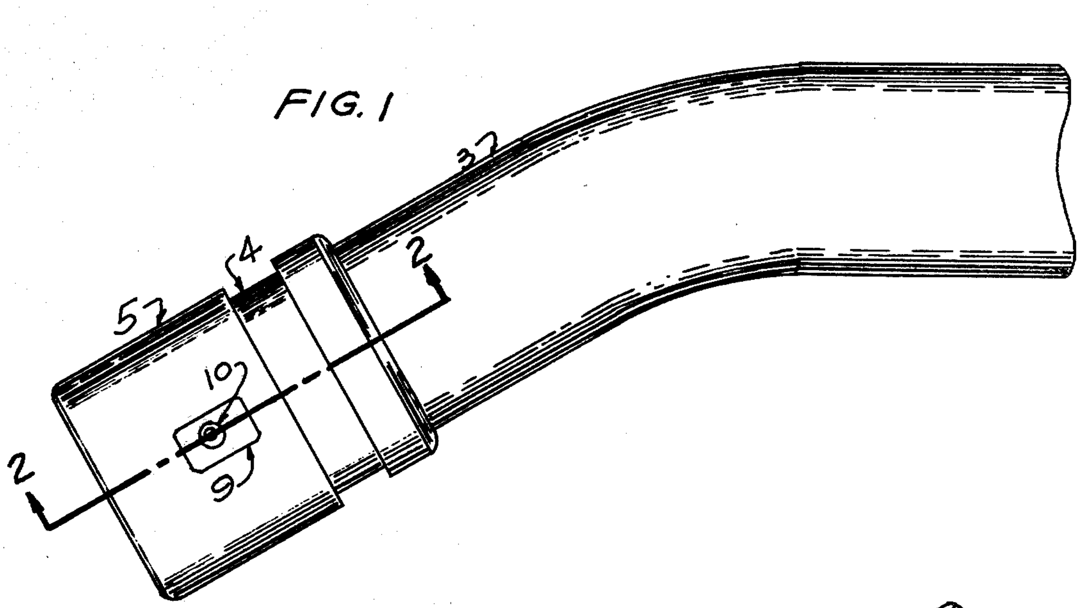
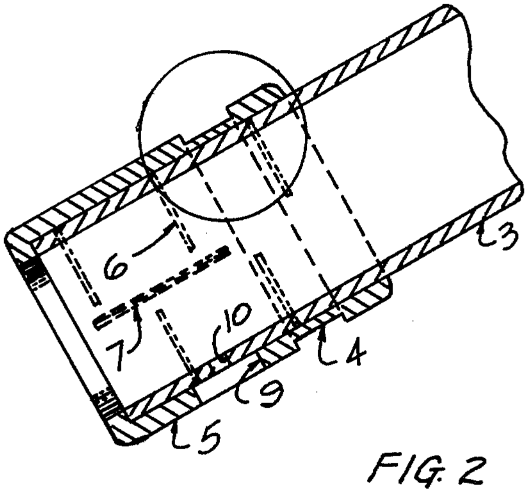
FIG. 2
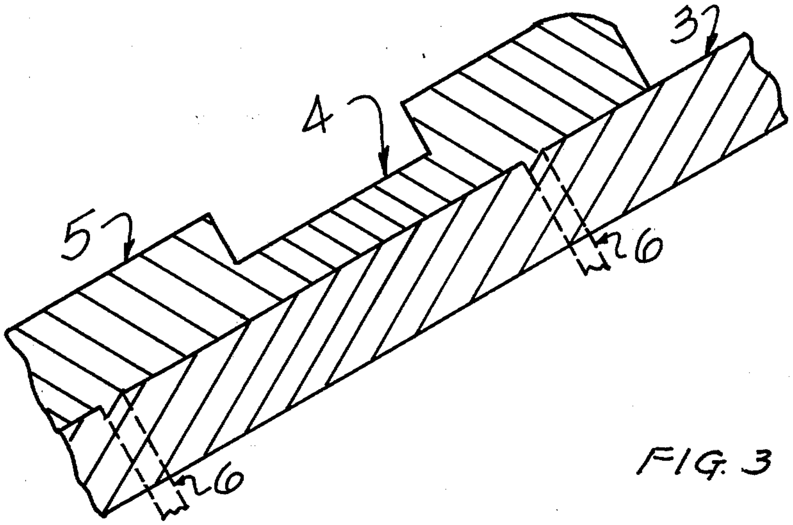
FIG. 3

GASOLINE NOZZLE ADAPTORS

BACKGROUND

1. Field of the Invention

, My invention relates to the field of the fuel nozzles. In particular, my invention is in the field of fuel nozzles that dispense leaded gasoline. The principle of the invention is to put an adaptor on the free end of the nozzle so that the resulting combination will be too large in outside diameter to be inserted into the small fuel pipes designed to receive lead free gasoline only. Leaded gasoline can damage equipment on vehicles designed for lead free gasoline such as catalytic converters.

2. The Prior Art

With the advent of the vehicles designed to use lead free gasoline, the problem arose of how to keep leaded gas from being pumped into such vehicles. The industry adopted a small fill pipe that would not receive standard size nozzles. A special small outside diameter nozzle is used to dispense lead free gasoline into the small fill pipe. One disadvantage of this system is that it is possible for normal wear to decrease the outside diameter a standard leaded gasoline nozzle so that it may be introduced into the fuel pipe of a lead free vehicle. This may occur either by accident or design. The retailer of gasoline is subject to inspections by enforcement agencies to see that his leaded gasoline nozzles have not worn in outside diameter so that they may be inserted in filler pipes designed for lead free fuel. If a violation is found, the retailer may be fined.

SUMMARY OF THE INVENTION

My invention is a solution to the problem of how to keep leaded gasoline nozzles from being inserted into lead free fill pipes.

A sleeve or collar is fitted to the free end of the nozzle. The sleeve is so sized that it can be forced on to the free end of the nozzle. Internal teeth are provided in the adaptor sleeve to prevent it from being pulled off of the nozzle or rotated on the nozzle when in use. At least one peripherial weakened wall section is provided in the nozzle adaptor sleeve so that if strain is put on the adaptor sleeve the adaptor sleeve will distort and cause the internal teeth to dig deeper into the nozzle. This prevents the nozzle adaptor sleeve from rotating or being pulled off the free end of the nozzle. This is necessary because of the rough service that a gasoline dispensing nozzle receives. The nozzle adaptor sleeve also acts as a stop to hold the free end of the nozzle in the filler pipe while the gasoline attendant performs other duties on the vehicle.

DESCRIPTION OF DRAWINGS

FIG. 1 is an elevational view of the invention, showing it on the tip of a gasoline dispensing nozzle.

FIG. 2 is a longitudinal section view of the invention taken along the plane 2—2 of FIG. 1.

FIG. 3 is a fragmentary sectional view of some of the teeth internal formed in accordance with the invention.

DESCRIPTION OF PREFERRED EMBODIMENT

As shown in the drawings, where like numerals refer to like parts throughout, the free end of a conventional leaded gasoline nozzle 3 may be seen. Typically, the nozzle 3 is made of a metal such as aluminum to make it light and also to be non sparking for safety purposes. However, aluminum being soft is subject to rapid wear when constantly being inserted and withdrawn from filler pipes normally made of steel. It is this tip wear that will reduce the outside diameter of the nozzle 3 so that is may be illegaly inserted into small diameter lead free filler pipes with subsequent damage to the vehicle and to the environment. To obviate this condition, I provide a tubular adaptor sleeve 5 to be forced on to the nozzle 3 with a friction fit. As best seen in FIG. 1, a portion of the adaptor sleeve is cut away forming the annular groove 4. The purpose of this purposely weakened section of the adaptor sleeve 5 is to cause the adaptor sleeve 5 to distort out of round when a strain is put upon it. Such a strain might be caused by the adaptor sleeve catching on the lip of the vehicle filler pipe (not shown) as the nozzle 3 is being removed. This distortion of the adaptor sleeve 5 causes the teeth 6,7 which are best seen in FIGS. 2 and 3 to cut deeper into the nozzle 3 thus preventing the adaptor sleeve 5 from coming loose. It will be observed that the teeth 6,7 are arranged both in annular rows 6 and in axial or longitudinal rows 7. The purpose of this is to resist both strains which might pull the adaptor sleeve 5 off the nozzle 3 and strains which might cause rotation of the adaptor sleeve 5 about the longitudinal axis of the nozzle 3. Although not a part of this invention, an opening 9 is provided in the adaptor sleeve 5 to register with an air vent 10 located near the end of the nozzle 3. This air vent 10 is part of the automatic fuel shut off mechanism and hence it should not be blocked.

The adaptor sleeve 5 is made of a metal that is non sparking and the teeth 6,7 connect the adaptor sleeve 5 to the tip of the nozzle 3 electrically as well as mechanically. This insures proper grounding of the nozzle adaptor to the vehicle fill pipe.

It will be noted that the adaptor sleeve 5 subtantially increases the diameter of the nozzle 3 at the tip of the nozzle 3. This makes the nozzle 3 incapable of being inserted into small diameter lead free filler pipes. The adaptor sleeve 5 is made of a material that is harder than the nozzle material. This reduces the abrasion wear at the nozzle tip and keeps the nozzle tip well within the legal size range. Because of its small size, the adaptor sleeve 5 does not add appreciable weight to the nozzle 3.

Depending on the properties of the metal used for the adaptor sleeve 5, it may be desireable to place a band (not shown) in the annular groove 4 before the adaptor sleeve 5 is forced on to the nozzle 3. The purpose of this band is to prevent any possible distortion of the adaptor sleeve as it is forced on to the nozzle tip. If such a band is used, it should be removed once the adaptor sleeve 5 is in place. To leave it on would defeat the purpose of the weakened section 4.

OPERATION

In operation, the internal diameter of the adaptor sleeve 5 which would be measured between the tips of the teeth 6 is made smaller than the diameter of the nozzle tip 3. The nozzle adaptor 5 is then forced onto the nozzle 3 with the teeth 6,7 making an interference fit. When the nozzle 3 comes in contact with something that puts a strain on the adaptor sleeve 5, the first thing to distort is the weakened portion 4. This purposeful distortion causes the nozzle adaptor sleeve 5 to go slightly out of round. This causes most of the teeth 6,7 to grip the nozzle 3 all the tighter thus preventing the removal of the nozzle adaptor sleeve 5.

In order to facilitate the distortion of the adaptor sleeve 5, the annular rows of teeth 6 should have gaps and not be complete 360° rings. This prevents the teeth 6 from acting as reinforcing ribs and slowing down the desired distortion of the adaptor sleeve 5.

The foregoing is considered as illustrative only of the principles of the invention. Furthermore, some numerous modifications and changes will readily occur to those skilled in the art, it is not desired to limit the invention to the exact construction and operation shown and described, and accordingly all suitable modifications and equivalents may be resorted to falling within the scope of the invention as claimed.

I claim as my invention:

1. An adaptor to prevent the insertion of a leaded gasoline nozzle into filler pipes intended for unleaded gasoline comprising a tubular housing with an inner diameter sized to be forced over the end of the nozzle and an outer diameter too large to be inserted into filler pipes intended for unleaded gasoline, said tubular housing having at least one annular weakened portion and at least one internal tooth incompassing less than 360° of arc, said annular weakened portion distorting when the adaptor is forced onto the end of the gasoline nozzle and forcing the internal teeth to grip the nozzle preventing removal of the adaptor.

* * * * *